US008893242B2

United States Patent
Kolluru et al.

(10) Patent No.: US 8,893,242 B2
(45) Date of Patent: Nov. 18, 2014

(54) SYSTEM AND METHOD FOR POOL-BASED IDENTITY GENERATION AND USE FOR SERVICE ACCESS

(75) Inventors: Raju Venkata Kolluru, San Jose, CA (US); Michael Dean Kleinpeter, San Francisco, CA (US); Liam Sean Lynch, San Jose, CA (US); Christopher J. Kasten, Rancho Cordova, CA (US); Rajesh Kanungo, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 1547 days.

(21) Appl. No.: 12/111,338

(22) Filed: Apr. 29, 2008

(65) Prior Publication Data

US 2009/0271625 A1    Oct. 29, 2009

(51) Int. Cl.
*H04L 29/06* (2006.01)
*G06Q 20/40* (2012.01)
*G06Q 20/38* (2012.01)
*G06F 21/33* (2013.01)
*G06Q 20/02* (2012.01)
*H04L 9/32* (2006.01)

(52) U.S. Cl.
CPC *H04L 9/32* (2013.01); *G06Q 20/40* (2013.01); *G06Q 20/3829* (2013.01); *G06F 21/33* (2013.01); *G06Q 20/02* (2013.01); *H04L 63/0442* (2013.01); *G06F 2221/2129* (2013.01); *H04L 63/126* (2013.01); *H04L 63/0823* (2013.01); *G06Q 20/4014* (2013.01)

USPC ............ 726/6; 713/155; 713/156; 713/159; 713/172; 713/176

(58) Field of Classification Search
CPC ........... G06Q 20/02; H04L 9/32; G06F 21/33
USPC ............................................................ 726/6
See application file for complete search history.

(56) References Cited

U.S. PATENT DOCUMENTS 6,014,660 A * 1/2000 Lim et al. ..................... 709/203
6,253,324 B1 6/2001 Field et al.
(Continued)

OTHER PUBLICATIONS

Polito et al., Inter-provider AAA and Billing of VoIP Users with Token-based Method, Jul. 2007, First International Global Information Infrastructure Symposium, pp. 159-166.*

(Continued)

*Primary Examiner* — Thanhnga B Truong
*Assistant Examiner* — Kenneth Chang
(74) *Attorney, Agent, or Firm* — Schwegman Lundberg & Woessner, P.A.

(57) ABSTRACT

A computer-implemented system and method for pool-based identity generation and use for service access is disclosed. The method in an example embodiment includes seeding an identity generator with a private key; retrieving independently verifiable data corresponding to a service consumer; using the independently verifiable data to create signed assertions corresponding to the service consumer; generating a non-portable identity document associated with the service consumer, the identity document including the signed assertions; signing the identity document with the private key; and conveying the signed identity document to the service consumer via a secure link.

9 Claims, 7 Drawing Sheets

(56) References Cited

U.S. PATENT DOCUMENTS

| | | | |
|---|---|---|---|
| 6,301,658 B1 | 10/2001 | Koehler | |
| 7,113,794 B2* | 9/2006 | Annamalai | 455/456.1 |
| 7,401,216 B2* | 7/2008 | Arkko et al. | 713/153 |
| 2002/0116642 A1* | 8/2002 | Joshi et al. | 713/201 |
| 2003/0013434 A1* | 1/2003 | Rosenberg et al. | 455/414 |
| 2003/0095527 A1* | 5/2003 | Shanbhag | 370/338 |
| 2003/0135628 A1* | 7/2003 | Fletcher et al. | 709/229 |
| 2003/0208533 A1* | 11/2003 | Farquharson et al. | 709/203 |
| 2004/0008666 A1* | 1/2004 | Hardjono | 370/352 |
| 2004/0153667 A1* | 8/2004 | Kastelewicz et al. | 713/201 |
| 2005/0015593 A1* | 1/2005 | Cheng et al. | 713/168 |
| 2006/0015729 A1* | 1/2006 | Novack et al. | 713/173 |
| 2006/0021018 A1* | 1/2006 | Hinton et al. | 726/10 |
| 2006/0080352 A1* | 4/2006 | Boubez et al. | 707/102 |
| 2007/0094493 A1* | 4/2007 | Ali et al. | 713/156 |
| 2007/0116004 A1* | 5/2007 | Kang et al. | 370/395.2 |

OTHER PUBLICATIONS

"Callback verification", http://en.wikipedia.org/wiki/Callback_verification, (Jan. 16, 2008).

Fiadeiro, Jose L., et al., "Model-based Verification of Service-oriented Systems", *Proposal in the Programme for International PhD Studentships*, http://www2.imm.dtu.dk/~nielson/PhD07/LEICE_A.pdf,(2007),1-5.

Hosamani, Mahantesh, et al., "Monitoring the Monitor: An Approach towards Trustworthiness in Service Oriented Architecture", *2nd International Workshop on Service Oriented Software Engineering: In Conjunction with the 6th ESEC/FSE Joint Meeting*, (2007),1-6.

Linn, C. M., et al., "Protecting Against Unexpected System Calls", *Proceedings of the 14th conference on USENIX Security Symposium*—vol. 14, (2005),1-16.

\* cited by examiner

SYSTEM AND METHOD FOR POOL-BASED IDENTITY GENERATION AND USE FOR SERVICE ACCESS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006-2008, eBay Inc., All Rights Reserved.

BACKGROUND

1. Technical Field

This disclosure relates to methods and systems supporting computing and data processing systems. More particularly, pool-based identity generation and use for service access.

2. Related Art

In Services Oriented Architecture (SOA), there are many communicating services that are deployed in several machines. In large-scale enterprises, like eBay, eTrade, or Google for example, there could be thousands of different services deployed in thousands of machines. It is most efficient if these services are allowed to communicate with each other. If these services are allowed to communicate with each other, various types of access controls and security checks will be required. These access controls and security checks can include, for example, service authentication, service authorization, and rate limiting. For example, a 'billing service' (caller service) can be authorized to access or call a 'rating calculator service' (callee service), while an 'about me service' will not be so authorized.

For the security checks described above, the callee service needs to be able to identify the caller service. For example, the 'rating calculator service' (callee service) needs to be able to identify the 'billing service' (caller service) prior to enabling access to the callee service. Human users can be easily authenticated by prompting for a password, for example. However, the same mechanisms used for identifying and authenticating human users cannot be used for identifying and authenticating computer-implemented services or software processes or applications. Services and/or applications cannot use password identification/authentication, such as by retrieving a password from disk storage; because, the passwords can be easily stolen and used for unauthorized purposes. In other words, passwords represent an example of undesirable portable credentials that cannot be used safely for identification/authentication of computer-implemented services or software processes or applications. Conventional identification/authentication mechanisms do not support a mechanism for providing non-portable credentials that can be used for identification/authentication of computer-implemented services or software processes or applications.

U.S. Patent Application No. 2005/0223109 describes a system wherein services such as product services, real-time services, and common services are deployed in a services oriented architecture. These services may, for example, be deployed for use in a variety of enterprise data integration functions.

U.S. Patent Application No. 2007/0011126 describes a service-oriented architecture (SOA) and accompanying method. In one embodiment, the SOA includes one or more service requesters coupled to one or more service providers via a bus. The bus includes runtime-binding functionality to facilitate interaction between the one or more service requesters and the one or more service providers. A registry, which stores information pertaining to a service provided by the one or more service providers, communicates with one or more service providers and/or requesters and the bus. In a more specific embodiment, bus includes a Service-Integration Bus (SIB) that includes a Service-Factory (SF) module for facilitating implementing the runtime binding functionality and for selectively invoking the service. Functionality of the SOA is strategically organized into various tiers and layers, including a requester tier, a provider tier, a business-process services tier, an infrastructure-services tier, an SIB layer, a persistence layer, and so on.

Thus, a computer-implemented system and method for pool-based identity generation and use for service access are needed.

BRIEF DESCRIPTION OF THE DRAWINGS

Embodiments illustrated by way of example and not limitation in the figures of the accompanying drawings, in which.

DETAILED DESCRIPTION

In the following description, for purposes of explanation, numerous specific details are set forth in order to provide a thorough understanding of some example embodiments. It will be evident, however, to one of ordinary skill in the art that the present invention may be practiced without these specific details.

As described further below, according to various example embodiments of the disclosed subject matter described and claimed herein, there is provided a computer-implemented system and method for pool-based identity generation and use for service access. Various embodiments are described below in connection with the figures provided herein.

In particular embodiments, an identity generator is provided to generate signed identity documents for deployment on target machines. Authentication can be based on the identity documents in combination with other independently verifiable data and tests performed on the identity documents and independently verifiable data. One example of the independently verifiable data is an Internet Protocol (IP) address of an application server or a computing system acting as a service consumer. The IP address can be independently verified from the TCP socket header as the raw socket packet structure contains the remote IP address. Additionally, the IP address can be independently verified by extracting the x-Forwarded HTTP (Hypertext Transfer Protocol) value inserted by a virtual IP address forwarding processor. Credentials can be generated by an authentication authority server upon successful completion of the tests on the identity documents and independently verifiable data. These credentials can then be used by other systems to access services and applications; because, the credentials can be trusted given the validation processing provided by the authentication authority server using the tests performed on the identity documents and independently verifiable data.

Figure 1:
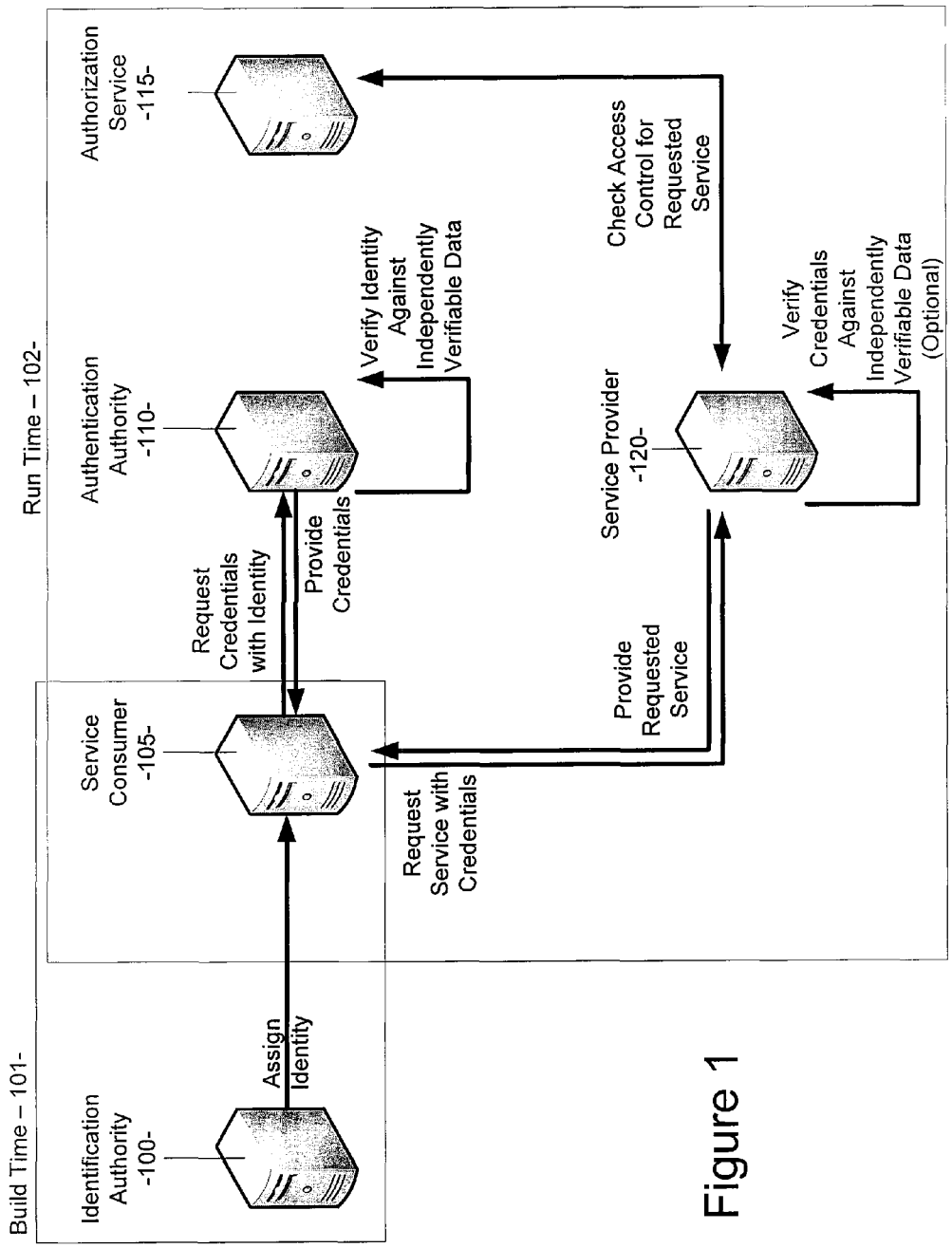
FIG. 1 is a block diagram of a network system in which an embodiment may operate.

Referring to FIG. 1, a diagram illustrates an example embodiment of a computer-implemented system for pool-based identity generation and use for service access. During a build time or initial system/service deployment time 101, an identification authority computing system or identity generator 100 can generate an identity for each of a plurality or pool of service consumers 105. The generated identity for a particular one of the service consumers 105 is maintained in an identity document that can be conveyed to the particular service consumer 105 by identity generator 100 via a secure link. A secure deployment tool, such as TIVOLI, can be used to perform the initial system/service deployment 101 with the identity document generated by the identity generator 100. Various embodiments for creating the identity document are described in more detail below.

The identity generator 100 can be initially seeded with a certificate and a private key used for signing the identity documents. The identity generator 100 can be maintained in a secure environment to protect the certificate and private key from being compromised. The identity document can be well protected by having read permission only granted to the service process (application) user name. The identity document is generated with signed assertions on the service host attributes, such as service names, IP addresses, and validity. As such, the identity document serves to bind the particular processing device at a particular IP address to the generated identity document in a secure manner. Once generated, the identity document can be digitally signed. As such, the identity document is a non-portable credential that cannot be used from other hosts. The identity document is only useful for identifying a particular processing device at a particular IP address.

In a particular embodiment, a well-known protocol, such as the security assertion markup language (SAML), can be used to communicate identity documents and credentials among the various components of the system. Conventional SAML is an XML (Extensible Markup Language) standard for exchanging authentication and authorization data between security domains, that is, between an identity provider (a producer of assertions) and a service provider (a consumer of assertions). SAML is a product of the OASIS Security Services Technical Committee. It will be apparent to those of ordinary skill in the art that other protocols may be used with various embodiments.

The single most important problem that SAML is trying to solve is the Web Browser Single Sign-On (SSO) problem. Single sign-on solutions are abundant at the intranet level (using cookies, for example); but, extending these solutions beyond the intranet has been problematic and has led to the proliferation of non-interoperable proprietary technologies. SAML has become a standard underlying many web Single Sign-On solutions in the enterprise identity management problem space. However, SAML does not specify the implementation of local authentication services; indeed, SAML does not care how local authentication services are implemented (although individual service providers most certainly will). A service provider relies on an authentication authority 110 to identify the service consumer as will be described in more detail below.

Thus, referring again to FIG. 1, the signed identity document generated by the identity generator 100 at initial system/service deployment time 101 can be conveyed to and stored by each service consumer 105. Once these identity documents are resident in each service consumer 105, a run time mode 102 can be initiated to enable the service consumers 105 to access and use a plurality of service providers 120 for the particular processing needs of the service consumers 105.

As well known to those of ordinary skill in the art, an authorization service (e.g. a role-based access control system or RBAC server) 115 can be configured to specifically grant or deny access to and/or use of particular services provided by the service providers 120 to particular service consumers 105. In this manner, a properly identified service consumer 105 can be granted or denied access to particular services of service providers 120 based on the configured information in authorization service 115. However, the service authorization provided by the authorization service 115 assumes that the identity of the requesting service consumer has already been verified. This service consumer 105 identity verification stage is a focus of a particular embodiment as described in more detail below.

Referring still to FIG. 1, once the signed identity document generated by the identity generator 100 at initial system/service deployment time 101 is stored by each service consumer 105 and a system run time mode 102 is initiated, each service consumer 105 can thereafter begin to use various services provided by the service providers 120. However, prior to accessing the services provided by the service providers 120, the service consumers 105 must obtain credentials from an authentication authority 110. The authentication authority 110 is a processing entity that is trusted by the service providers 120. As such, a service consumer 105 providing credentials validated by the authentication authority 110 can obtain access to or use of a requested service, assuming such service access or use is authorized by the authorization service 115. Therefore, service providers 120 do not need to access the identification authority 100 to validate the identity of a service consumer 105.

During a system run time mode 102, a service consumer 105 can request credentials from the authentication authority 110. As part of this request for credentials, the service consumer 105 provides its identity document, or a portion thereof, to the authentication authority 110. The authentication authority 110 can use a public key to verify the identity document. Further, the authentication authority 110 can validate the identity document by verifying the content of the identity document against independently verifiable data. As described above, the independently verifiable data can include an Internet Protocol (IP) address of the service consumer 105. Thus, the service consumer 105 IP address, name, attributes, or other identifying information that was included in the identity document originally generated by the identity generator 100 can be validated by the authentication authority 110 once the authentication authority 110 obtains the independently verifiable data and matches the data with the corresponding data in the identity document of the service consumer 105. If the authentication authority 110 is able to match the independently verifiable data with the corresponding data in the identity document of the service consumer 105, the authentication authority can generate credentials for the service consumer 105 and convey the credentials to the service consumer 105. The credentials created for the service consumer 105 by the authentication authority 110 can include assertions of the validity of the identity of the service consumer 105. These credentials can be digitally signed by the authentication authority 110 using conventional methods.

Once the service consumer 105 obtains valid credentials from the authentication authority 110, the service consumer 105 may thereafter request access to or use of the services provided by the service providers 120. When a service consumer 105 wishes to use a service of service providers 120, the service consumer 105 makes a request for the service. The service request includes the credentials for the requesting service consumer 105 as obtained from the authentication authority 110. The service request with credentials is conveyed to the particular service provider 120. A SAML communication can be used for this service request.

When the service provider 120 receives a request for service with credentials from a service consumer 105, the service provider 120 can respond in various ways. First, the service provider 120 can verify the credentials created by the authentication authority 110 using a public key or certificate. Because the service provider 120 trusts the authentication authority 110 to properly validate the identity of the service consumer 105, the service provider 120 may accept the identity of the service consumer 105, given an apparently valid credential with the proper content and assertions. Optionally, the service provider 120 can validate the credentials by verifying the content of the credentials against independently verifiable data. As described above, the independently verifiable data can include an Internet Protocol (IP) address of the service consumer 105. Thus, the service consumer 105 IP address, name, attributes, or other identifying information that was included in the credentials originally generated by the authentication authority 110 can be validated by the service provider 120 once the service provider 120 obtains the independently verifiable data and matches the data with the corresponding data in the credentials of the service consumer 105. If the service provider 120 is able to match the independently verifiable data with the corresponding data in the credentials of the service consumer 105, the service provider 120 can accept the identity of the service consumer 105.

Once the identity of the service consumer 105 is verified by the service provider 120, given the credentials as part of a service request, the service provider 120 may access the authorization service 115 to check the access controls previously configured for the service consumer 105 in regard to the requested service. If the requesting service consumer 105 is authorized to access or use the requested service as determined using the authorization service 115, the service provider 120 can grant access or use of the requested service to the requesting service consumer 105. Thereafter, the requested service and related data is provided to the requesting service consumer 105. Using a similar process as described above, the service consumer 105 can access and/or use any of the authorized services provided by the service providers 120. In each request for service, the service provider 120 does not need to access the identity generator 100 or the authentication authority 110 to validate the identity of the service consumer 105. Rather, because of the novel configuration and processing of a particular embodiment, the service providers 120 can trust the authentication authority 110 to validate the identity of the service consumers 105 and generate valid credentials for the service consumers 105. Further, the authentication authority 110 can trust the identity generator 100 to generate valid identity documents for the service consumers 105.

Figure 2:
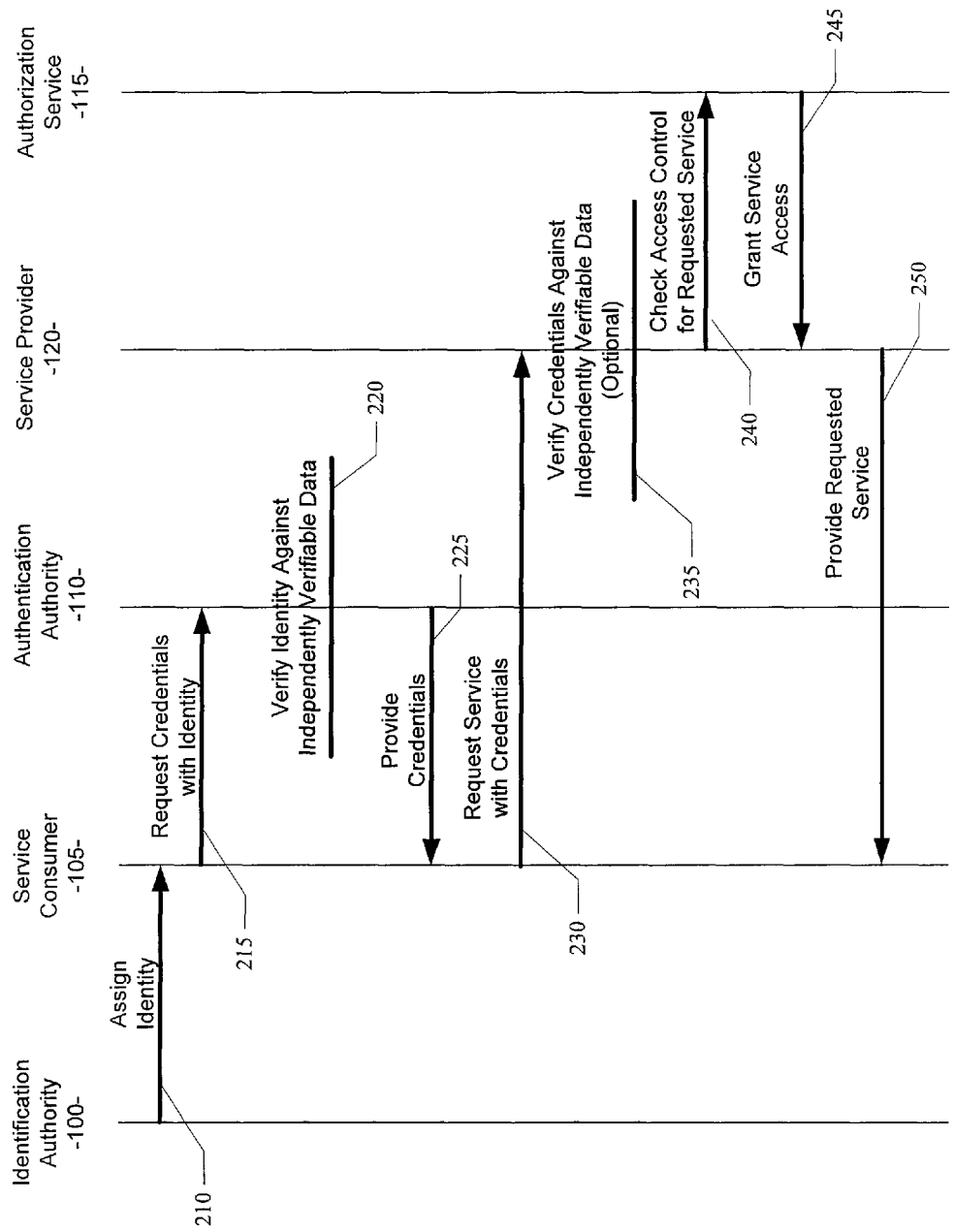
FIG. 2 is an event diagram showing a sequence of operations in one example embodiment.

FIG. 2 is an event diagram showing a sequence of operations in one example embodiment. In a first operation 210 of the example embodiment shown in FIG. 2, the identity generator 100 generates an identity document for a service consumer 105 and sends the identity document to the service consumer 105. This operation typically occurs at initial system/service deployment time 101. In the next operation 215 of the example embodiment, the service consumer 105 can use the identity document, or a portion thereof, to generate a request for credentials that can be sent to an authentication authority 110. Once the credentials are received back from the authentication authority 110, the service consumer 105 can use these credentials for requesting services from a service provider 120 in subsequent operations during system run time 102. In the next operation 220 of the example embodiment, the authentication authority 110 receives a request for credentials from the service consumer. The request for credentials will include the identity document, or a portion thereof, as generated by the identity generator 100 for the service consumer 105. The authentication authority 110 can use a public key to verify the portion of the identity document that contains independently verifiable data associated with the service consumer 105. As described above, the independently verifiable data can include an IP address of the service consumer 105. During operation 220, the authentication authority 110 can validate the identity document, or portion thereof, received in the request for credentials by verifying the content of the identity document against independently verifiable data. The authentication authority 110 can obtain the independently verifiable data and match the independently obtained data with the corresponding data in the identity document, or portion thereof, of the service consumer 105. If the authentication authority 110 is able to match the independently verifiable data with the corresponding data in the identity document of the service consumer 105, the authentication authority can generate credentials for the service consumer 105 and convey the credentials to the service consumer 105 in operation 225 shown in FIG. 2. The credentials created for the service consumer 105 by the authentication authority 110 can include assertions of the validity of the identity of the service consumer 105. These credentials can be digitally signed by the authentication authority 110 using conventional methods.

In the next operation 230 of the example embodiment, the service consumer 105 can use the credentials received from the authentication authority 110, or a portion thereof, to generate a request for service from a service provider 120. The service request with credentials, or portion thereof, is conveyed to the particular service provider 120 in operation 230. A SAML communication can be used for this service request.

In the next operation 235 of the example embodiment, the service provider 120 receives a request for service with credentials from a service consumer 105. In response to the service request, the service provider 120 can respond in various ways. First, the service provider 120 can verify the credentials created by the authentication authority 110 using a public key. Because the service provider 120 trusts the authentication authority 110 to properly validate the identity of the service consumer 105, the service provider 120 may accept the identity of the service consumer 105, given an apparently valid credential with the proper content and assertions. Optionally, the service provider 120 can validate the credentials in operation 235 by verifying the content of the credentials against independently verifiable data. As described above, the independently verifiable data can include an Internet Protocol (IP) address of the service consumer 105. Thus, the service consumer 105 IP address, name, attributes, or other identifying information that may have been included in the credentials originally generated by the authentication authority 110 can be validated by the service provider 120 once the service provider 120 obtains the independently verifiable data and matches the data with the corresponding data in the credentials of the service consumer 105. If the service provider 120 is able to match the independently verifiable data with the corresponding data in the credentials of the service consumer 105, the service provider 120 can accept the identity of the service consumer 105.

In the next operation 240 of the example embodiment, the service provider 120 may access the authorization service 115 to check the access controls previously configured for the service consumer 105 in regard to the requested service. If the requesting service consumer 105 is authorized to access or use the requested service as determined using the authorization service 115, the service provider 120 can be given the authority by authorization service 115 to grant access or use of the requested service to the requesting service consumer 105 in operation 245. Thereafter, the requested service and related data is provided to the requesting service consumer 105 in operation 250. Using a similar process as described above, the service consumer 105 can access and/or use any of the authorized services provided by the service providers 120. In each request for service, the service provider 120 does not need to access the identity generator 100 or the authentication authority 110 to validate the identity of the service consumer 105. Rather, because of the novel configuration and processing of a particular embodiment, the service providers 120 can trust the authentication authority 110 to validate the identity of the service consumers 105 and generate valid credentials for the service consumers 105. Further, the authentication authority 110 can trust the identity generator 100 to generate valid identity documents for the service consumers 105.

Figure 3:
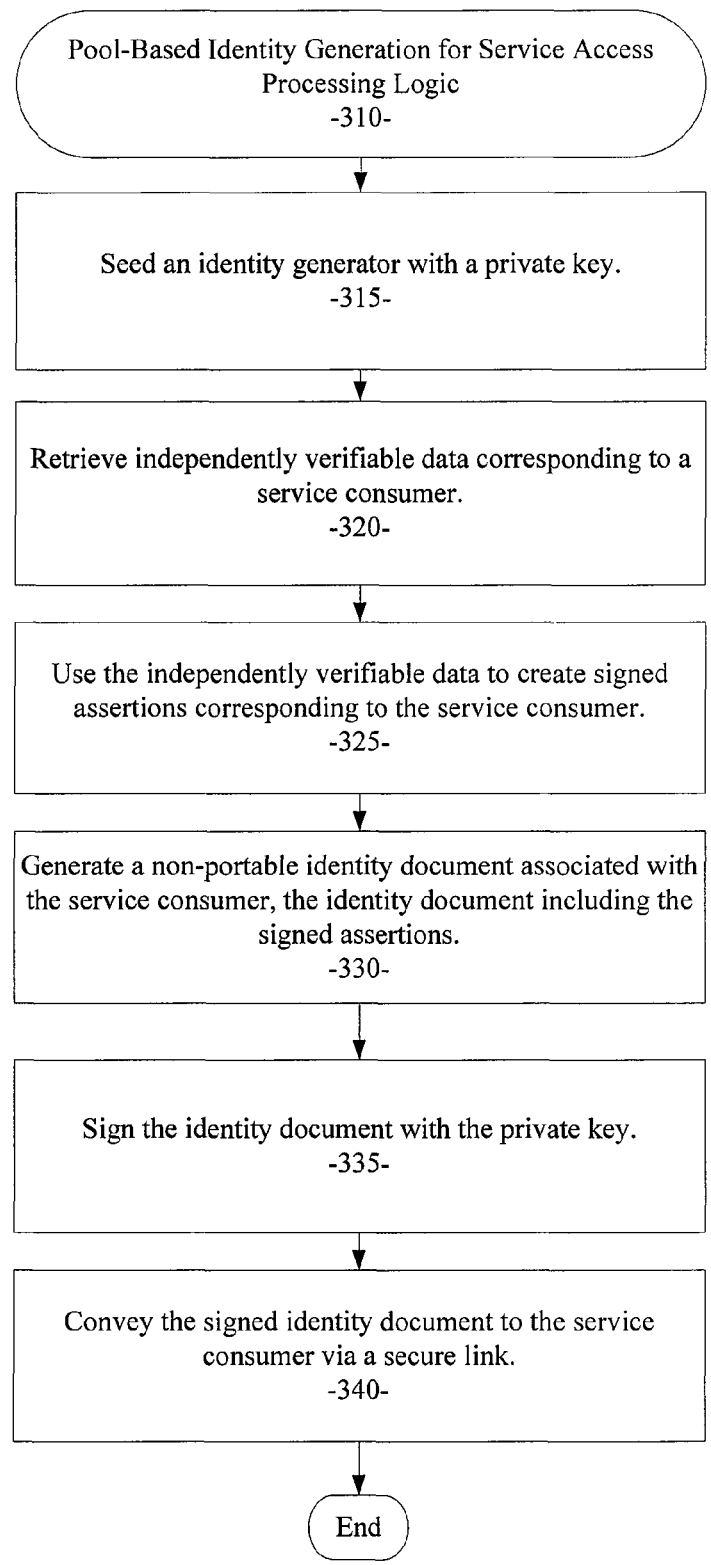
FIGS. 3-6 illustrate processing flow diagrams for various example embodiments.

FIG. 3 illustrates a processing flow diagram for an example embodiment. In the embodiment 310 shown, a pool-based identity generation apparatus for service access performs the steps of: seeding an identity generator with a private key (processing block 315); retrieving independently verifiable data corresponding to a service consumer (processing block 320); using the independently verifiable data to create signed assertions corresponding to the service consumer (processing block 325); generating a non-portable identity document associated with the service consumer, the identity document including the signed assertions (processing block 330); signing the identity document with the private key (processing block 335); and conveying the signed identity document to the service consumer via a secure link (processing block 340).

Figure 4:
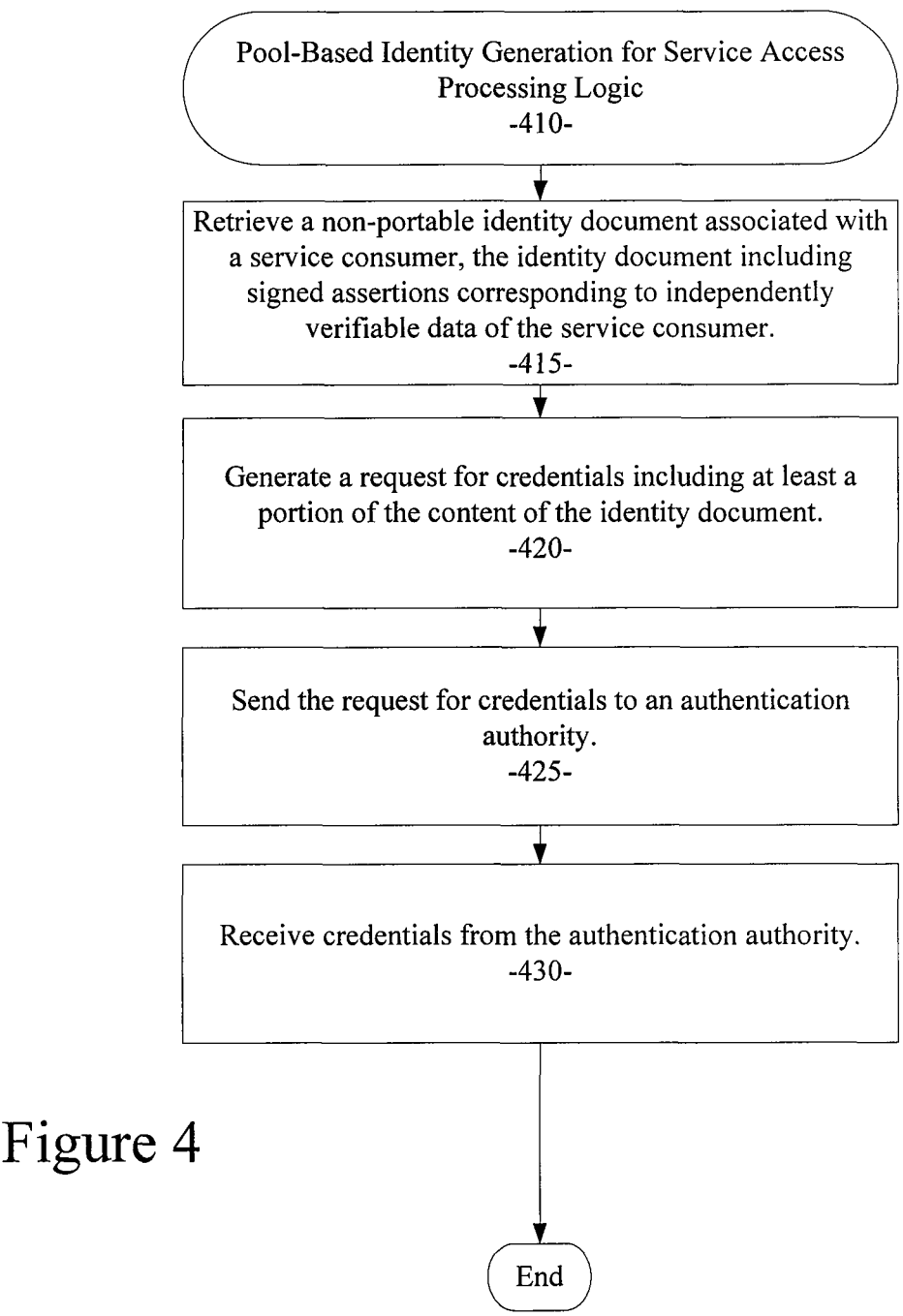

FIG. 4 illustrates a processing flow diagram for another example embodiment. In the embodiment 410 shown, a pool-based identity generation apparatus for service access performs the steps of: retrieving a non-portable identity document associated with a service consumer, the identity document including signed assertions corresponding to independently verifiable data of the service consumer (processing block 415); generating a request for credentials including at least a portion of the content of the identity document (processing block 420); sending the request for credentials to an authentication authority (processing block 425); and receiving credentials from the authentication authority (processing block 430).

Figure 5:
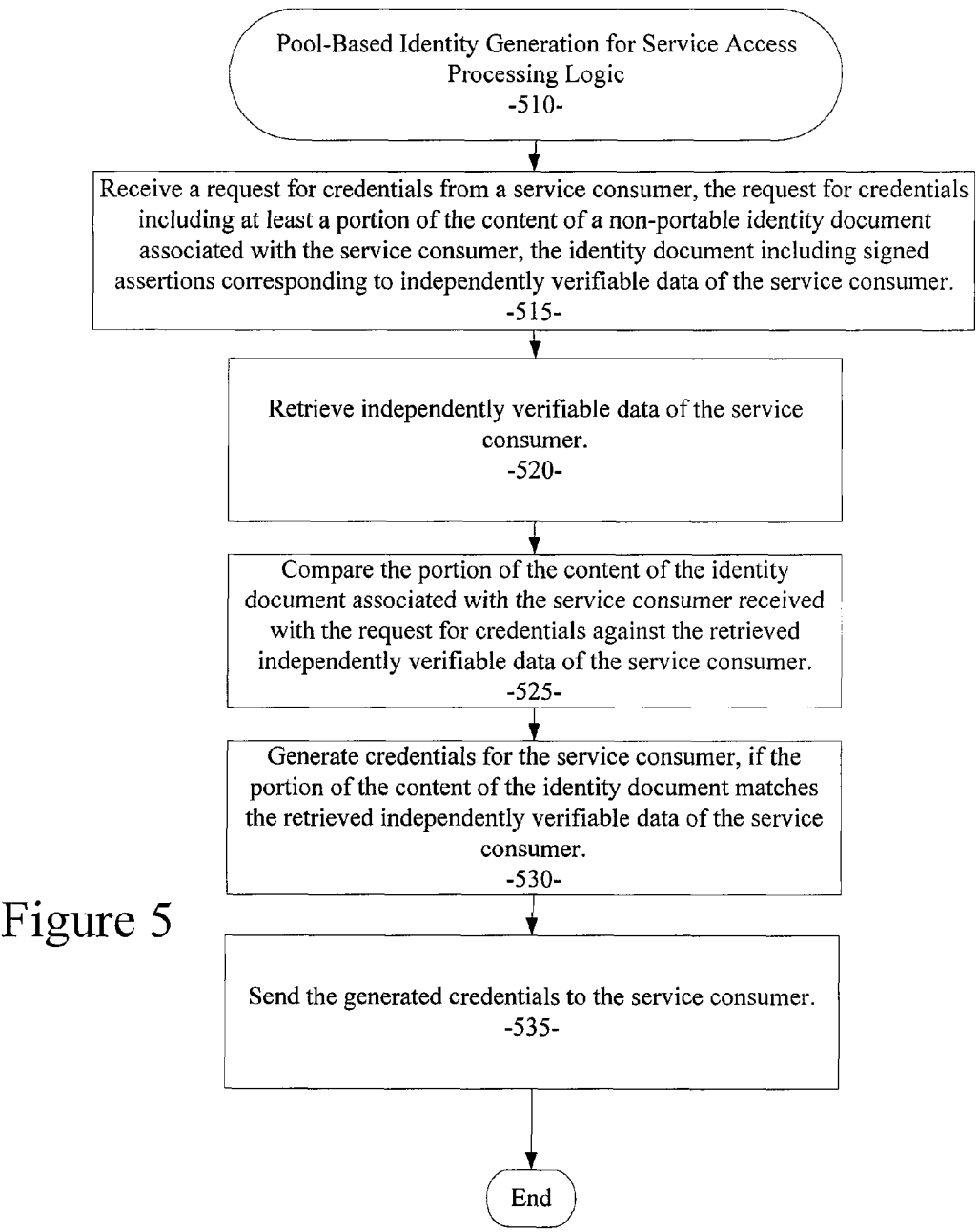

FIG. 5 illustrates a processing flow diagram for another example embodiment. In the embodiment 510 shown, a pool-based identity generation apparatus for service access performs the steps of: receiving a request for credentials from a service consumer, the request for credentials including at least a portion of the content of a non-portable identity document associated with the service consumer, the identity document including signed assertions corresponding to independently verifiable data of the service consumer (processing block 515); retrieving independently verifiable data of the service consumer (processing block 520); comparing the portion of the content of the identity document associated with the service consumer received with the request for credentials against the retrieved independently verifiable data of the service consumer (processing block 525); generating credentials for the service consumer, if the portion of the content of the identity document matches the retrieved independently verifiable data of the service consumer (processing block 530); and sending the generated credentials to the service consumer (processing block 535).

Figure 6:
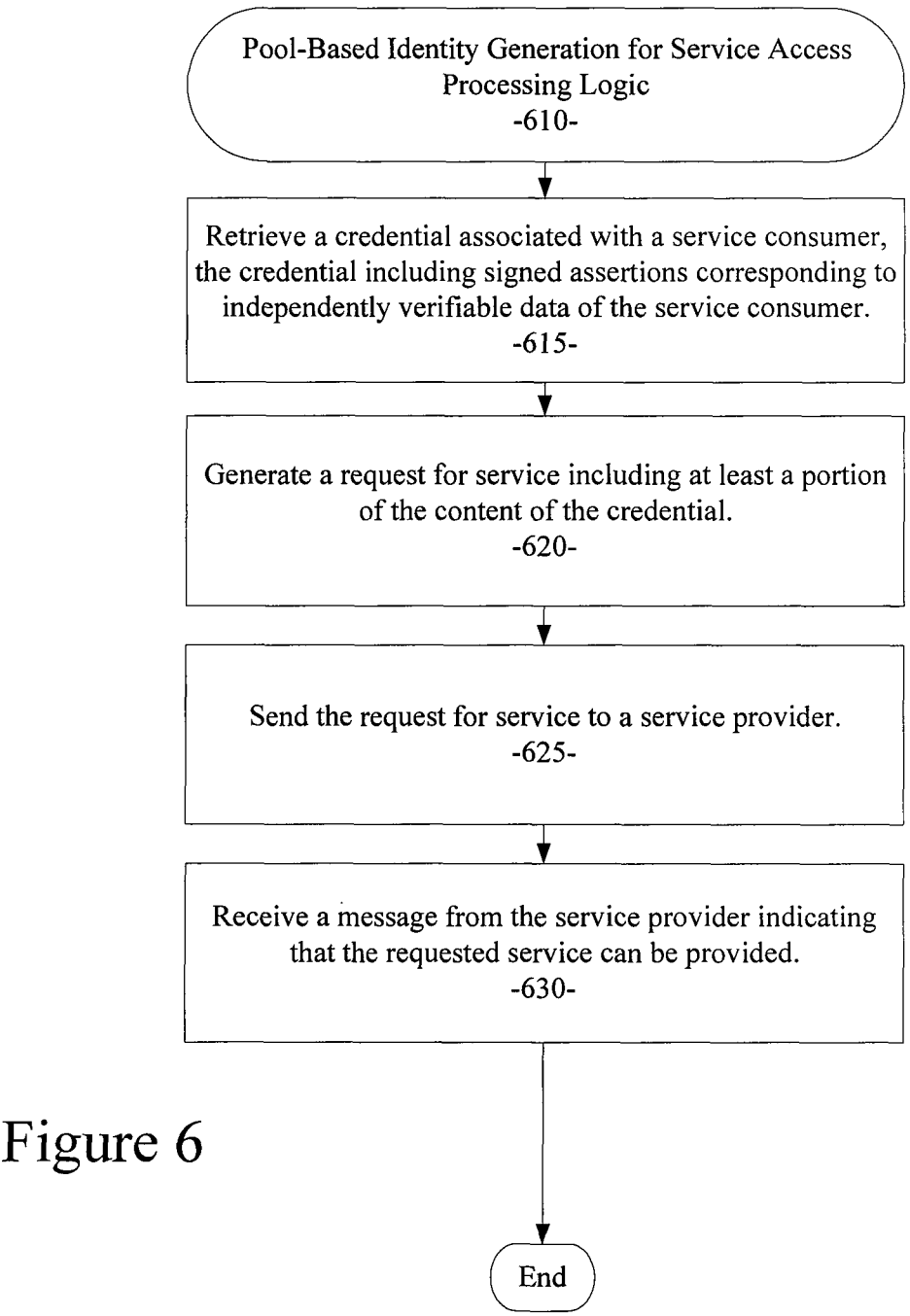

FIG. 6 illustrates a processing flow diagram for another example embodiment. In the embodiment 610 shown, a pool-based identity generation apparatus for service access performs the steps of: retrieving a credential associated with a service consumer, the credential including signed assertions corresponding to independently verifiable data of the service consumer (processing block 615); generating a request for service including at least a portion of the content of the credential (processing block 620); sending the request for service to a service provider (processing block 625); and receiving a message from the service provider indicating that the requested service can be provided (processing block 630).

Figure 7:
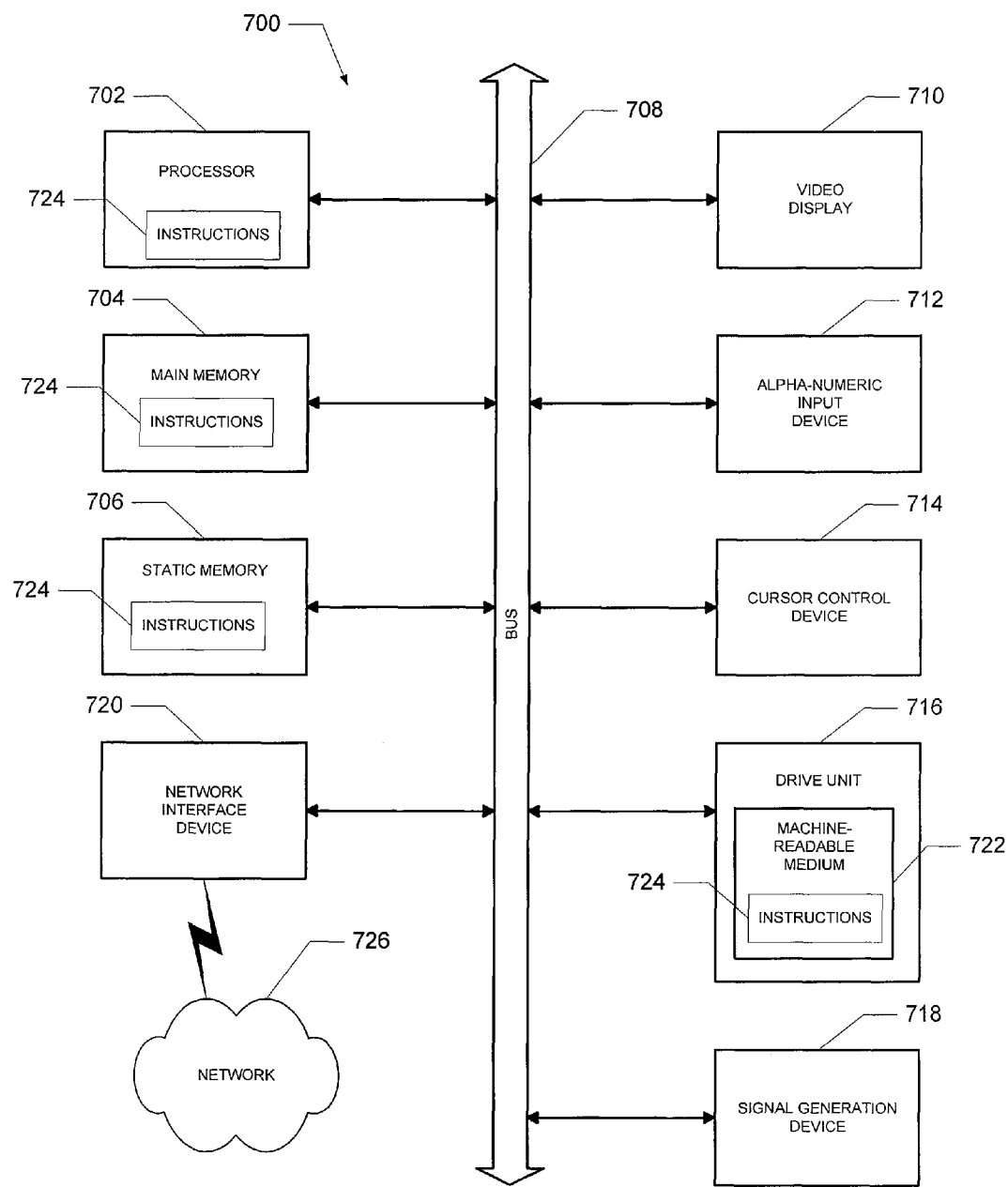
FIG. 7 shows a diagrammatic representation of a machine in the form of a computer system within which a set of instructions, for causing the machine to perform any one or more of the methodologies discussed herein, may be executed, according to an example embodiment.

FIG. 7 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals. As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, a computer-implemented system and method for pool-based identity generation and use for service access are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:

1. A method comprising:

receiving, by a service consumer from an identification authority, a non-portable identity document associated with the service consumer, the identity document including signed assertions corresponding to independently verifiable data of the service consumer, the independently verifiable data including an IP address of the service consumer, the identity document being bound to the IP address of the service consumer, and the signed assertions being compatible with a security assertion markup language;

generating, by use of a processor of the service consumer, a request for credentials including at least a portion of the content of the identity document, the portion including an assertion corresponding to the IP address;

sending the request for credentials from the service consumer to an authentication authority; and based on a match between the IP address corresponding to the assertion included in the sent portion of the content of the identity document and an IP address retrieved by the authentication authority based on the request but independently from the identity document, receiving credentials from the authentication authority by the service consumer; and sending the received credentials along with a request for service from the service consumer to a service provider.

2. The method of claim 1, further comprising:

seeding the identification authority with a private key;

sending independently verifiable data corresponding to the service consumer to the identification authority, the independently verifiable data including an IP address of the service consumer; and at the identification authority, (i) using the independently verifiable data to create signed assertions corresponding to the service consumer, (ii) generating, by use of a processor, a non-portable identity document associated with the service consumer, the identity document including the signed assertions, the identity document being bound to the IP address of the service consumer, and (iii) signing the identity document with the private key.

3. The method as claimed in claim 2 wherein the identity document is stored by the service consumer.

4. A method comprising:

receiving, by an authentication authority, a request for credentials from a service consumer, the request for credentials including at least a portion of the content of a non-portable identity document associated with the service consumer and received by the service consumer from an identification authority, the identity document portion including signed assertions corresponding to independently verifiable data of the service consumer, the independently verifiable data including an IP address of the service consumer, the identity document being bound to the IP address of the service consumer, and the signed assertions being compatible with a security assertion markup language;

retrieving, by the authentication authority, the IP address of the service consumer based on the request, independently from the identity document;

comparing, by the authentication authority, the IP address corresponding to an assertions included in the received portion of the content of the identity document associated with the service consumer against the IP address retrieved independently therefrom;

generating, by use of a processor of the authentication authority, credentials for the service consumer based on a match between the IP address corresponding to an assertion included in the received portion of the content of the identity document and the IP address retrieved independently therefrom; and sending the generated credentials from the authentication authority to the service consumer for providing the credentials along with a request for service to a service provider.

5. The method of claim 4, wherein the IP address is retrieved, independently from the identity document, from a TCP socket header associated with the request or by extracting a value inserted by a virtual IP address forwarding processor.

6. A method comprising:

retrieving, by a service consumer, a credential associated with the service consumer from an authentication authority, the credential including signed assertions corresponding to independently verifiable data of the service consumer, the independently verifiable data including an IP address of the service consumer, the credential being bound to the IP address of the service consumer, and the signed assertions being compatible with a security assertion markup language;

generating, by use of a processor of the service consumer, a request for service including at least a portion of the content of the credential, the portion including an assertion corresponding to the IP address;

sending the request for service from the service consumer to a service provider; and based on a match between the IP address corresponding to the assertion included in the sent portion of the content of the credential and an IP address retrieved by the service provider based on the request but independently from the credential, receiving a message from the service provider indicating that the requested service can be provided.

7. The method as claimed in claim 6 wherein the service provider checks access control data for a requested service and the service consumer via an authorization service.

8. A system comprising:

a processor;

a memory coupled to the processor to store information related to credentials for a service consumer;

a credential request receiver to receive a request for credentials from a service consumer, the request for credentials including at least a portion of the content of a non-portable identity document associated with the service consumer and received by the service consumer from an identification authority, the identity document including signed assertions corresponding to independently verifiable data of the service consumer, the signed assertions being compatible with a security assertion markup language, the credential request receiver further to retrieve, based on the request for credentials but independently from the identity document, an IP address of the service consumer, and to compare the IP address corresponding to an assertions included in the portion of the content of the identity document associated with the service consumer received with the request for credentials against the independently retrieved IP address; and a credential generator to generate, by use of the processor, credentials for the service consumer based on a match between the IP address corresponding to an assertion included in the received portion of the content of the identity document and the independently retrieved IP address of the service consumer, the generated credentials being bound to the IP address of the service consumer; and to send the generated credentials to the service consumer for providing the credentials along with a request for service to a service provider.

9. The system as claimed in claim 8 wherein the generated credentials are bound to a service name.

* * * * *

UNITED STATES PATENT AND TRADEMARK OFFICE
CERTIFICATE OF CORRECTION

PATENT NO. : 8,893,242 B2
APPLICATION NO. : 12/111338
DATED : November 18, 2014
INVENTOR(S) : Kolluru et al.

Page 1 of 1

It is certified that error appears in the above-identified patent and that said Letters Patent is hereby corrected as shown below:

Claims
In column 10, line 39, in Claim 2, after "consumer," delete "¶", therefor Signed and Sealed this
Seventeenth Day of November, 2015

Michelle K. Lee
*Director of the United States Patent and Trademark Office*